(12) United States Patent
Ashiba

(10) Patent No.: US 10,359,115 B2
(45) Date of Patent: Jul. 23, 2019

(54) CYLINDER DEVICE AND SEAL MEMBER

(71) Applicant: HITACHI AUTOMOTIVE SYSTEMS, LTD., Hitachinaka-shi, Ibaraki (JP)

(72) Inventor: Masahiro Ashiba, Naka-gun (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 628 days.

(21) Appl. No.: 15/024,123

(22) PCT Filed: Sep. 25, 2014

(86) PCT No.: PCT/JP2014/075505
§ 371 (c)(1),
(2) Date: Mar. 23, 2016

(87) PCT Pub. No.: WO2015/046366
PCT Pub. Date: Apr. 2, 2015

(65) Prior Publication Data
US 2016/0230893 A1     Aug. 11, 2016

(30) Foreign Application Priority Data

Sep. 30, 2013   (JP) ................................ 2013-205281

(51) Int. Cl.
*F16J 15/32*      (2016.01)
*F16J 15/3268*    (2016.01)
(Continued)

(52) U.S. Cl.
CPC ........... *F16J 15/3268* (2013.01); *F16F 9/363* (2013.01); *F16J 15/3276* (2013.01); *F16J 15/56* (2013.01)

(58) Field of Classification Search
CPC ...... F15B 15/1442; F16F 9/36; F16J 15/3232; F16J 15/3268; F16J 15/3276; F16J 15/56
See application file for complete search history.

(56) References Cited

U.S. PATENT DOCUMENTS

| | | | |
|---|---|---|---|
| 3,173,698 A * | 3/1965 | Haberkorn | F16J 15/3268 277/574 |
| 2009/0140496 A1* | 6/2009 | Otani | F16F 9/36 277/562 |

FOREIGN PATENT DOCUMENTS

| | | | | |
|---|---|---|---|---|
| GB | 2101237 A * | 1/1983 | | F16J 15/3268 |
| JP | 03-051246 | 5/1991 | | |

(Continued)

OTHER PUBLICATIONS

International Search Report for PCT/JP2014/075505 dated Oct. 28, 2014, 2 pages.

(Continued)

*Primary Examiner* — Thomas E Lazo
(74) *Attorney, Agent, or Firm* — Mattingly & Malur, PC

(57) ABSTRACT

A cylinder device includes; a cylinder; a rod protruding from the cylinder; an annular member formed at one end side of the cylinder; an annular closing section formed further outward in a cylinder inward/outward direction than the annular member to close the one end side of the cylinder; and an annular seal ring provided inward in the cylinder inward/outward direction from an outer circumferential side of the closing section. The seal ring includes: a front end side outer circumferential seal section; a base end side outer circumferential seal section; a front end side inner circumferential abutting section; and a base end side inner circumferential abutting section. At least one set of seal sections or abutting sections is constituted by convex sections protruding in a radial direction.

9 Claims, 3 Drawing Sheets

(51) Int. Cl.
*F16J 15/3276* (2016.01)
*F16J 15/56* (2006.01)
*F16F 9/36* (2006.01)

(56) References Cited

FOREIGN PATENT DOCUMENTS

| | | |
|---|---|---|
| JP | 04-071835 | 6/1992 |
| JP | 06-037658 | 5/1994 |
| JP | 2011-052732 | 3/2011 |
| WO | WO 2007/066504 | 6/2007 |

OTHER PUBLICATIONS

Written Opinion of the ISA for PCT/JP2014/075505 dated Oct. 28, 2014, 3 pages.

\* cited by examiner

CYLINDER DEVICE AND SEAL MEMBER

TECHNICAL FIELD

The present invention relates to a cylinder device and a seal member.

This application is the U.S. national phase of International Application No. PCT/JP2014/075505 filed Sep. 25, 2014 which designated the U.S. and claims priority Japanese Patent Application No. 2013-205281, filed Sep. 30, 2013, the entire contents of which are incorporated herein by reference.

BACKGROUND ART

There is a technology of sealing an inner circumferential portion of a cylinder of a cylinder device using a seal ring (for example, see Patent Literature 1).

CITATION LIST

Patent Literature

[Patent Literature 1]
  Japanese Unexamined Patent Application, First Publication No. 2011-52732

SUMMARY OF INVENTION

Technical Problem

In order to increase sealability of a seal ring, it is considered to increase a volume of the seal ring. However, when the volume of the seal ring is increased, assembly of the seal ring to a cylinder device may become difficult.

The present invention provides a cylinder device and a seal member that are capable of improving an assembly property of a seal ring.

Solution to Problem

According to a first aspect of the present invention, a cylinder device includes a cylinder in which a working fluid is enclosed; a rod protruding from at least one end of the cylinder; an annular member formed at one end side of the cylinder; an annular closing section formed further outward in a cylinder inward/outward direction than the annular member to close the one end side of the cylinder; and an annular seal ring provided inward in the cylinder inward/outward direction from an outer circumferential side of the closing section to come in contact with an outer circumferential portion of the annular member and an inner circumferential portion of the cylinder.

The seal ring includes a front end side outer circumferential seal section formed at an outer circumferential side to come in contact with the inner circumferential portion of the cylinder; a base end side outer circumferential seal section formed at the outer circumferential side closer to the closing section than the front end side outer circumferential seal section to come in contact with the inner circumferential portion of the cylinder; a front end side inner circumferential abutting section formed at the inner circumferential side to come in contact with the outer circumferential portion of the annular member; and a base end side inner circumferential abutting section formed at the inner circumferential side closer to the closing section than the front end side inner circumferential abutting section to come in contact with the outer circumferential portion of the annular member.

At least one set of seal sections or abutting sections of the front end side outer circumferential seal section and the base end side outer circumferential seal section, and the front end side inner circumferential abutting section and the base end side inner circumferential abutting section is constituted by convex sections protruding in a radial direction.

According to a second aspect of the present invention, the convex sections are a front end side inner circumferential convex section formed at the front end side inner circumferential abutting section and a base end side inner circumferential convex section formed at the base end side inner circumferential abutting section.

The convex sections come in contact with the outer circumferential portion of the annular member to press the front end side outer circumferential seal section and the base end side outer circumferential seal section outward in the radial direction.

According to a third aspect of the present invention, shapes of the seal ring is formed such that, when the seal ring is inserted between the outer circumferential portion of the annular member and the inner circumferential portion of the cylinder, the base end side inner circumferential convex section comes in contact with the annular member before the front end side inner circumferential convex section comes in contact with the annular member.

According to a fourth aspect of the present invention, shapes of the seal ring is formed such that, when the seal ring is inserted between the outer circumferential portion of the annular member and the inner circumferential portion of the cylinder, before a state in which the front end side inner circumferential convex section comes in contact with the annular member and the front end side outer circumferential seal section comes in contact with the inner circumferential portion of the cylinder, the base end side inner circumferential convex section comes in contact with the annular member and the base end side outer circumferential seal section comes in contact with the inner circumferential portion of the cylinder.

According to a fifth aspect of the present invention, the convex sections are a front end side outer circumferential convex section formed at the front end side outer circumferential seal section and a base end side outer circumferential convex section formed at the base end side outer circumferential seal section. The convex sections come in contact with the inner circumferential portion of the cylinder to press the front end side inner circumferential abutting section and the base end side inner circumferential abutting section inward in the radial direction.

According to a sixth aspect of the present invention, the seal ring is integrally formed with the closing section.

According to a seventh aspect of the present invention, an outer diameter of the seal ring is larger than an inner diameter of the inner circumferential portion of the cylinder.

According to an eighth aspect of the present invention, a contact surface of the annular member with the seal ring may be a tapered surface.

According to a ninth aspect of the present invention, the front end side outer circumferential seal section and the front end side inner circumferential abutting section, and the base end side outer circumferential seal section and the base end side inner circumferential abutting section may overlap each other at positions in an axial direction.

According to a tenth aspect of the present invention, a seal member comes in contact with an annular inner circumferential portion and an annular member formed in an inner circumferential portion to seal the inner circumferential portion.

The seal member includes an annular closing section disposed coaxially with the annular member; and an annular seal ring integrally formed with an outer circumferential side of the closing section to come in contact with the inner circumferential portion.

The seal ring has a front end side outer circumferential seal section formed at the outer circumferential side to come in contact with the inner circumferential portion; a base end side outer circumferential seal section formed at the outer circumferential side closer to the closing section than the front end side outer circumferential seal section to come in contact with the inner circumferential portion; a front end side inner circumferential convex section protruding at an inner circumferential side to come in contact with an outer circumferential portion of the annular member to press the front end side outer circumferential seal section outward in a radial direction; and a base end side inner circumferential convex section protruding at the inner circumferential side closer to the closing section than the front end side inner circumferential convex section to come in contact with the outer circumferential portion of the annular member to press the base end side outer circumferential seal section outward in the radial direction.

Advantageous Effects of Invention

According to the above-mentioned cylinder device and seal member, an assembly property of the seal ring can be improved.

DESCRIPTION OF EMBODIMENTS

An embodiment of the present invention will be described below with reference to the accompanying drawings.

Figure 1:
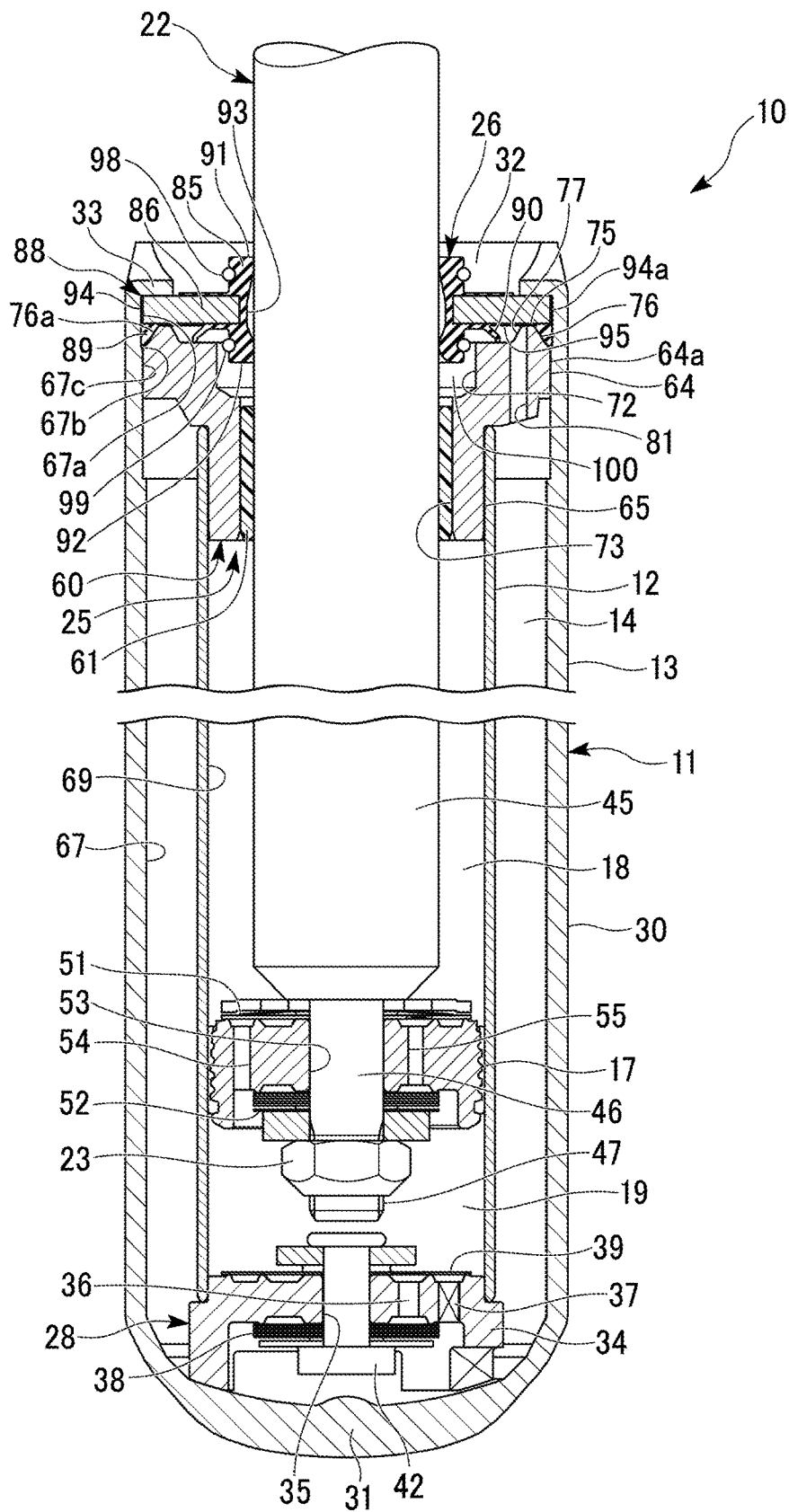
FIG. 1 is a cross-sectional view showing a cylinder device according to an embodiment of the present invention.

A cylinder device 10 according to an embodiment shown in FIG. 1 is used for a suspension apparatus of an automobile or a railroad vehicle. The cylinder device 10 has a cylinder 11 in which a working fluid is sealed. The cylinder 11 has an inner tube 12 and an outer tube 13 having a diameter larger than that of the inner tube 12 and coaxially disposed to cover the inner tube 12. The cylinder 11 has a dual tube structure in which a reservoir chamber 14 is formed between the inner tube 12 and the outer tube 13.

A piston 17 is slidably fit into the inner tube 12 of the cylinder 11. The piston 17 defines an upper chamber 18 and a lower chamber 19 in the inner tube 12, i.e., the cylinder 11.

Specifically, in the cylinder 11, a hydraulic fluid serving as a working fluid is enclosed in the upper chamber 18 and the lower chamber 19, and a hydraulic fluid serving as a working fluid and a gas are enclosed in the reservoir chamber 14.

A rod 22 is connected to the piston 17. A first side in an axial direction of the rod 22 is connected to the piston 17 inserted into the cylinder 11, and a second side in the axial direction protrudes from one end in the axial direction of the cylinder 11 (in an upward/downward direction of FIG. 1, hereinafter, referred to as a cylinder axial direction), i.e., one end of the inner tube 12 and the outer tube 13 to the outside. The piston 17 is fastened to an end portion in the inner tube 12 of the rod 22 by a nut 23, and moves integrally with the piston 17.

An annular rod guide (an annular member) 25 and an annular seal member 26 are coaxially disposed inside the cylinder 11 at one end side in the cylinder axial direction in which the rod 22 protrudes. The seal member 26 is installed farther outside (an upper side in the upward/downward direction of FIG. 1) than the rod guide 25 in the inward/outward direction in the cylinder axial direction (in the upward/downward direction of FIG. 1, hereinafter, referred to as a cylinder inward/outward direction). In other words, the rod guide 25 is installed inward in the cylinder inward/outward direction from the seal member 26 (a lower side in the upward/downward direction of FIG. 1). A base valve 28 is installed inside the cylinder 11 opposite to the rod guide 25 and the seal member 26 in the cylinder axial direction.

The rod 22 is slidably inserted through the rod guide 25 and the seal member 26. One end portion of the rod 22 disposed in the cylinder 11 is disposed on a central axis of the cylinder 11 by the piston 17 disposed in the inner tube 12. In addition, an intermediate portion in the axial direction of the rod 22 is disposed on the central axis of the cylinder 11 by the rod guide 25 fit into the cylinder 11. That is, the rod 22 is supported coaxially with the cylinder 11 by the piston 17 and the rod guide 25.

The rod guide 25 movably supports the rod 22 in the axial direction while suppressing movement in the radial direction. As a result, the rod guide 25 guides movement of the rod 22. The outer circumferential portion of the seal member 26 is closely fit into the outer tube 13 of the cylinder 11. The rod 22 is inserted into the seal member 26 such that the rod 22 is closely fit into an inner circumferential portion. Accordingly, the seal member 26 closes one end side of the cylinder 11, and restricts leakage of a hydraulic fluid in the inner tube 12 and a high pressure gas and a hydraulic fluid in the reservoir chamber 14 to the outside.

The outer tube 13 of the cylinder 11 forms a substantially bottomed cylindrical shape having a cylindrical trunk section 30, a bottom portion 31 configured to close an end portion opposite to a protrusion side of the rod 22 in the trunk section 30, and a locking section 33 protruding from a position of an opening section 32 of a protrusion side of the rod 22 in the trunk section 30 inward in the radial direction.

The inner tube 12 of the cylinder 11 has a cylindrical shape. One end side in the axial direction of the inner tube 12 is supported while fitted into a base body 34 of the base valve 28 disposed inside the bottom portion 31 of the outer tube 13, and the other end side in the axial direction is supported while fitted into the rod guide 25 fit into the opening section 32 of the outer tube 13.

A through-hole 35 passing in the axial direction at a center in the radial direction is formed in the base body 34 of the base valve 28. A liquid passage 36 and a liquid passage 37 passing in the axial direction are formed in the base body 34 around the through-hole 35. The liquid passage 36 and the liquid passage 37 are able to communicate with the lower chamber 19 in the inner tube 12 and the reservoir chamber 14 between the outer tube 13 and the inner tube 12. A disk valve 38 is disposed at a bottom portion 31 side of the base body 34, and a disk valve 39 is disposed at an opposite side of the bottom portion 31. The disk valve 38, which is a compression side damping valve, is able to open and close the liquid passage 36 inside of the base body 34 in the radial direction. The disk valve 39, which is a check valve, is able to open and close the liquid passage 37 further outward in the radial direction of the base body 34 than the liquid passage 36. These disk valves 38 and 39 are attached to the base body 34 by a rivet 42 inserted and caulked into the through-hole 35 of the base body 34.

The disk valve 38 allows a flow of a hydraulic fluid that flows from the lower chamber 19 toward the reservoir chamber 14 via a passage hole (not shown) formed in the disk valve 39 and the liquid passage 36. The disk valve 38 controls a flow of the hydraulic fluid to generate a damping force. The disk valve 38 restricts a flow of the hydraulic fluid in a direction opposite thereto. That is, the disk valve 38 is a damping valve configured to generate a damping force as the liquid passage 36 is opened when the rod 22 moves toward a compression side and the piston 17 moves toward the lower chamber 19 to increase a pressure of the lower chamber 19.

The disk valve 39 allows a flow of the hydraulic fluid from the reservoir chamber 14 toward the lower chamber 19 via the liquid passage 37 with no resistance. The disk valve 39 restricts a flow of the hydraulic fluid in a direction opposite thereto. The disk valve 39 opens the liquid passage 37 when the rod 22 moves toward an extension side and the piston 17 moves toward the upper chamber 18 to lower the pressure of the lower chamber 19. The disk valve 39 is a suction valve configured to allow a hydraulic fluid to flow without a substantial generation of a damping force from the reservoir chamber 14 into the lower chamber 19 when the liquid passage 37 is opened.

The rod 22 has a main shaft section 45 having a constant diameter, and an inner end shaft section 46 of an end portion thereof inserted into the inner tube 12. The inner end shaft section 46 has a diameter smaller than the main shaft section 45, and a male screw 47 is formed at an opposite side of the main shaft section 45. The nut 23 is screwed onto the male screw 47. The piston 17 and disk valves 51 and 52 of both sides thereof are attached to the rod 22 by the nut 23.

A through-hole 53 passing in the axial direction at the center in the radial direction is formed in the piston 17. A liquid passage 54 and a liquid passage 55 passing in the axial direction are formed around the through-hole 53. The inner end shaft section 46 of the rod 22 is inserted into the through-hole 53. The liquid passage 54 and the liquid passage 55 are able to communicate with the lower chamber 19 closer to the bottom portion 31 than the piston 17 in the inner tube 12 and the upper chamber 18 further opposite to the bottom portion 31 than the piston 17 in the inner tube 12.

In the piston 17, the disk valve 52 is disposed at a bottom portion 31 side while the disk valve 51 is disposed at an opposite side of the bottom portion 31. The disk valve 51 is a compression side damping valve configured to open and close the liquid passage 54 outward in the radial direction of the piston 17. The disk valve 52 is an extension-side damping valve configured to open and close the liquid passage 55 inward in the radial direction of the piston 17.

The disk valve 51 allows a flow of the hydraulic fluid from the lower chamber 19 toward the upper chamber 18 but restricts a flow of the hydraulic fluid in a direction opposite thereto. The disk valve 51 opens the liquid passage 54 when the rod 22 moves toward a compression side and the piston 17 moves toward the lower chamber 19 to increase the pressure of the lower chamber 19. The disk valve 51 generates a damping force when the liquid passage 54 is opened. That is, the disk valve 51 is a compression side damping valve. The disk valve 52 allows a flow of the hydraulic fluid from an upper chamber 18 side to the lower chamber 19 but restricts a flow of the hydraulic fluid in a direction opposite thereto. The disk valve 52 opens the liquid passage 55 when the rod 22 moves to the extension side and the piston 17 moves toward the upper chamber 18 to increase the pressure of the upper chamber 18. The disk valve 52 generates a damping force when the liquid passage 55 is opened. That is, the disk valve 52 is an extension-side damping valve.

Here, when the rod 22 moves toward the extension side to increase a protrusion amount from the cylinder 11, the hydraulic fluid corresponding thereto flows to the lower chamber 19 via the liquid passage 37 while opening the disk valve 39 of the base valve 28 from the reservoir chamber 14. On the contrary, when the rod 22 moves toward the compression side and an insertion amount into the cylinder 11 is increased, the hydraulic fluid corresponding thereto flows to the reservoir chamber 14 via the liquid passage 36 while opening the disk valve 38 from the lower chamber 19.

The rod guide 25 is constituted by a rod guide main body 60 having a substantially stepped annular shape, and a cylindrical collar 61 fitted and fixed into an inner circumferential portion of the rod guide main body 60. An outer circumferential side of the rod guide main body 60 has a shape in which an annular large diameter outer circumferential portion 64 is formed at a first side in the axial direction and a small diameter outer circumferential portion 65 having a diameter smaller than that of the large diameter outer circumferential portion 64 is formed at a second side in the axial direction. The large diameter outer circumferential portion 64 and the small diameter outer circumferential portion 65 are coaxially formed. In the rod guide main body 60, the large diameter outer circumferential portion 64 is fit into an inner circumferential portion 67 of the trunk section 30 of the outer tube 13 of the cylinder 11. An inner circumferential surface 67a constituted by a cylindrical surface outward in the cylinder inward/outward direction is formed at the inner circumferential portion 67. In addition, an inner circumferential surface 67b constituted by a tapered surface having a diameter reduced inward is formed at the inner circumferential portion 67 further inside in the cylinder inward/outward direction than the inner circumferential surface 67a. In addition, an inner circumferential surface 67c constituted by a cylindrical surface having a diameter smaller than that of the inner circumferential surface 67a is formed at the inner circumferential portion 67 further inside in the cylinder inward/outward direction than the inner circumferential surface 67b. An outer circumferential surface 64a of the large diameter outer circumferential portion 64 comes in contact with the entire circumference of the inner circumferential surface 67c of the inner circumferential portion 67 while fit into a defined position of the outer tube 13. In addition, the small diameter outer circumferential portion 65 of the rod guide main body 60 is fit into an inner circumferential surface of an inner circumferential portion 69 of the inner tube 12 of the cylinder 11. Here, the outer circumferential surface of the small diameter outer circumferential portion 65 comes in contact with the inner circumferential surface of the inner circumferential portion 69 throughout the entire circumference.

An inner circumferential side of the rod guide main body 60 has a shape in which a large diameter inner circumferential portion 72 is formed at a large diameter outer circumferential portion 64 side in the axial direction and a small diameter inner circumferential portion 73 having a diameter smaller than that of the large diameter inner circumferential portion 72 is formed at a small diameter outer circumferential portion 65 side in the axial direction.

An annular convex section 75 having an annular shape protruding in the axial direction is formed at an end portion of the large diameter outer circumferential portion 64 side in the axial direction of the rod guide main body 60. The annular convex section 75 has a tapered shape having a diameter reduced as an outer circumferential portion 76 goes toward a protrusion front end side and a tapered shape having a diameter increased as an inner circumferential portion 77 goes toward a protrusion front end side. As shown by a two-dot chain line of FIG. 2, in the outer circumferential portion 76 of the annular convex section 75, an outer circumferential surface (a contact surface) 76a formed from an intermediate portion to a front end portion in a protrusion direction forms a tapered surface, and an outer circumferential surface 76b formed at a base end portion in the protrusion direction forms a cylindrical surface. As shown in FIG. 1, the inner circumferential surface of the inner circumferential portion 77 forms a tapered surface. The outer circumferential portion 76 and the inner circumferential portion 77 are disposed coaxially with the large diameter outer circumferential portion 64, and thus, the outer circumferential surfaces 76a and 76b of the outer circumferential portion 76 are disposed coaxially with the outer circumferential surface 64a of the large diameter outer circumferential portion 64.

Figure 2:
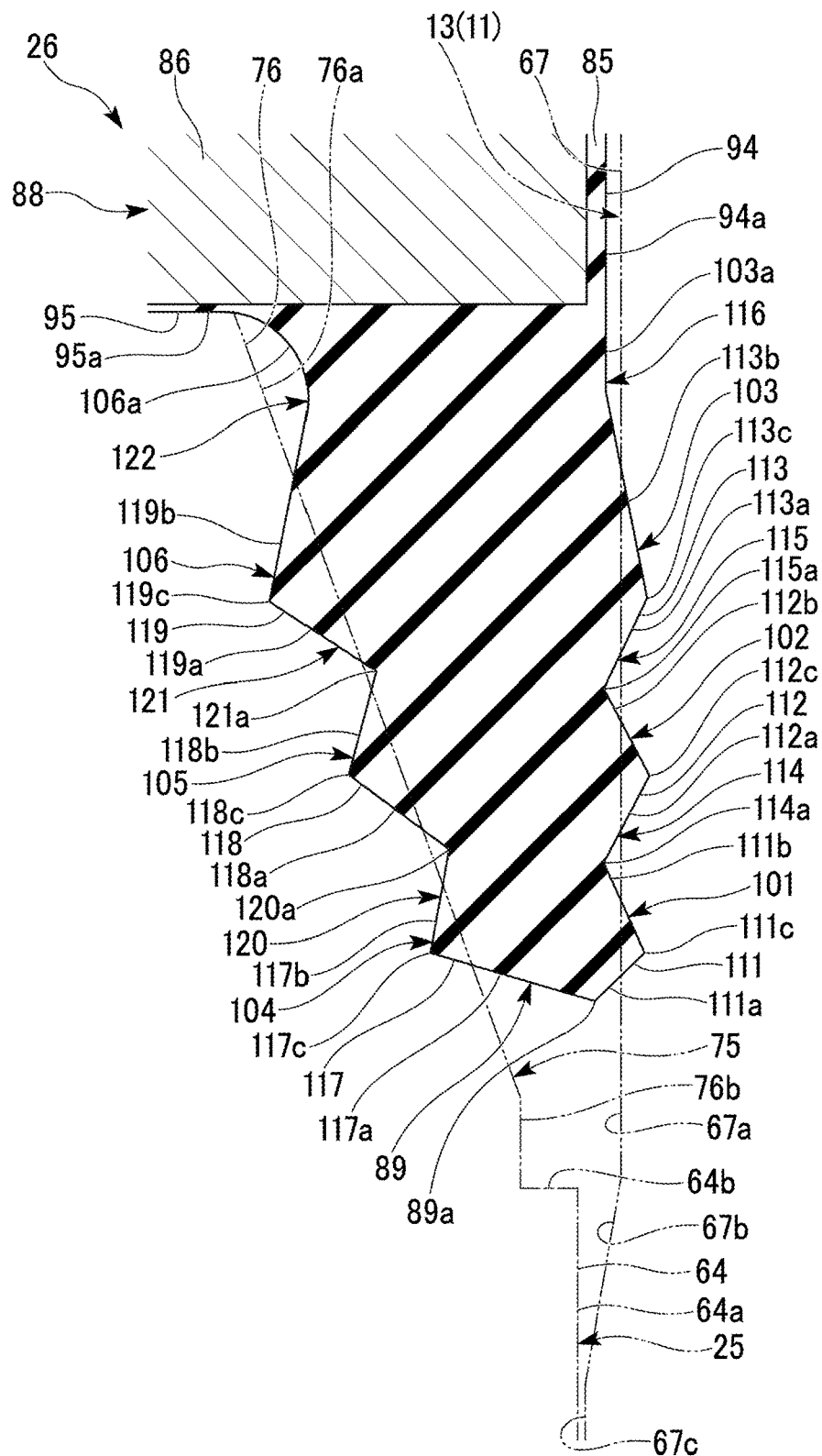
FIG. 2 is a partially enlarged cross-sectional view showing a major part of the cylinder device according to the embodiment of the present invention.

As shown in FIG. 2, a maximum outer diameter of the annular convex section 75, i.e., an outer diameter of the outer circumferential surface 76b has a diameter smaller than an outer diameter of the outer circumferential surface 64a of the large diameter outer circumferential portion 64. Accordingly, the large diameter outer circumferential portion 64 has a stepped surface 64b perpendicular to the outer circumferential surfaces 64a and 76b and configured to connect the surfaces 64a and 76b between the outer circumferential surface 76b and the large diameter outer circumferential portion 64. The stepped surface 64b is disposed coaxially with the outer circumferential surfaces 76a and 76b.

As shown in FIG. 1, a communication hole 81 passing in the axial direction is formed at the rod guide main body 60 at a position inward from the annular convex section 75 in the radial direction. The communication hole 81 is in communication with the reservoir chamber 14 between the outer tube 13 and the inner tube 12. The collar 61 is fitted and fixed into the small diameter inner circumferential portion 73 of the rod guide main body 60, and the main shaft section 45 of the rod 22 is inserted into the collar 61 to come in sliding contact therewith.

The outer circumferential side of the seal member 26 comes in contact with the annular inner circumferential portion 67 of the outer tube 13 and the annular rod guide 25 installed in the inner circumferential portion 67 to seal the inner circumferential portion 67 of the outer tube 13. In addition, the inner circumferential portion of the seal member 26 comes in contact with the outer circumferential portion of the main shaft section 45 of the rod 22 to seal the outer circumferential portion of the main shaft section 45. Accordingly, the seal member 26 closes a space between the outer tube 13 and the main shaft section 45 of the rod 22.

The seal member 26 is an integrally formed product in which an annular member 86 is embedded in an elastic member 85. The elastic member 85 is formed of a rubber material having good sliding property such as nitrile rubber, fluororubber, or the like. The annular member 86 is formed of a metal and has an annular shape. The annular member 86 maintains a shape of the seal member 26. The circular pipe member 86 produces strength for fixation to a target area in the seal member 26.

The seal member 26 has an annular closing section 88 constituted by a portion of the elastic member 85 and the annular member 86, an annular seal ring 89 constituted by a portion of the elastic member 85, and an annular check lip 90 constituted by a portion of the elastic member 85. Since the seal member 26 is an integrally formed product, the seal ring 89 and the check lip 90 are integrally formed with the closing section 88.

The closing section 88 is a portion which closes the opening section 32 of the one end side in the cylinder axial direction of the cylinder 11. A portion of the closing section 88 formed of the elastic member 85 is constituted by a dust lip 91, an oil lip 92, an inner circumferential coating section 93, an outer circumferential seal 94 and an end surface seal 95. The closing section 88 is disposed coaxially with the rod guide 25 in the cylinder 11.

The dust lip 91 extends from an inner circumferential side of the annular member 86 to form a cylindrical shape outward in the cylinder inward/outward direction. The inner circumferential portion of the dust lip 91 has a diameter reduced as it goes outward in the cylinder inward/outward direction. The oil lip 92 extends from the inner circumferential side of the annular member 86 to form a cylindrical shape inward in the cylinder inward/outward direction. The inner circumferential portion of the oil lip 92 has a diameter reduced as it goes inward in the cylinder inward/outward direction. The inner circumferential coating section 93 connects the dust lip 91 and the oil lip 92 while covering the inner circumferential side of the annular member 86. The outer circumferential seal 94 covers the outer circumferential surface of the annular member 86 and forms a cylindrical shape. The end surface seal 95 covers an end surface inward in the cylinder inward/outward direction of the annular member 86. An annular spring 98 is mounted on an outer circumferential portion of the dust lip 91 and an annular spring 99 is mounted on an outer circumferential portion of the oil lip 92.

The seal ring 89 is installed inward in the cylinder inward/outward direction of the outer circumferential side of the closing section 88, and connected to the outer circumferential seal 94 and the end surface seal 95 of the closing section 88. The seal ring 89 comes in contact with the outer circumferential surface 76a of the outer circumferential portion 76 of the annular convex section 75 of the rod guide 25 and the inner circumferential surface 67a of the inner circumferential portion 67 of the outer tube 13 of the cylinder 11. That is, the outer circumferential surface 76a and the inner circumferential surface 67a become contact surfaces that come in contact with the seal ring 89, and the outer circumferential surface 76a of these becomes a tapered surface. The check lip 90 forms an annular shape, and extends from an intermediate portion in the radial direction of the end surface seal 95 while increasing a diameter as it goes inward in the cylinder inward/outward direction.

The main shaft section 45 of the rod 22 is inserted through the seal member 26 attached to the cylinder 11 inside the dust lip 91, the inner circumferential coating section 93 and the oil lip 92. In this state, one end of the rod 22 extends from the seal member 26 to the outside.

The spring 98 fit into the dust lip 91 holds a clamping force of an adhesion direction of the dust lip 91 to the rod 22 in a constant state. In addition, the spring 98 is also used for adjusting the clamping force to satisfy a design specification. The spring 99 fit into the oil lip 92 adjusts a clamping force in an adhesion direction of the oil lip 92 to the rod 22. When the clamping forces of the dust lip 91 and the oil lip 92 satisfy the design specification, the springs 98 and 99 may not be provided. In addition, any one of the springs 98 and 99 may be used.

The check lip 90 holds a predetermined interference at a portion more inward than the annular convex section 75 of the rod guide 25 to enable a sealed contact throughout the entire circumference. Hydraulic fluid leaked from a gap between the rod guide 25 and the rod 22 is collected into a chamber 100 closer to the gap than the check lip 90. The check lip 90 is opened when the pressure of the chamber 100 is increased to be higher than the pressure of the reservoir chamber 14 by a predetermined amount and causes the hydraulic fluid collected in the chamber 100 to flow into the reservoir chamber 14 via the communication hole 81. That is, the check lip 90 functions as a check valve configured to allow a flow of a hydraulic fluid and a gas only in a direction from the chamber 100 to the reservoir chamber 14 and restrict the flow in a direction opposite thereto.

The seal ring 89 in a natural state before assembly to the cylinder device 10 will be described with reference to FIG. 2. Further, in FIG. 2, the large diameter outer circumferential portion 64 and the outer circumferential portion 76 of the inner circumferential portion 67 of the outer tube 13 and the rod guide 25 in a state assembled to the cylinder device 10 with respect to the seal ring 89 in the natural state are shown by a two-dot chain line.

The seal ring 89 has a first outer circumferential seal section 101, a second outer circumferential seal section 102, a third outer circumferential seal section 103, a first inner circumferential abutting section 104, a second inner circumferential abutting section 105 and a third inner circumferential abutting section 106.

The first outer circumferential seal section 101 is formed at an outer circumferential side of a front end portion opposite to the closing section 88 in the seal ring 89. The second outer circumferential seal section 102 is formed at an outer circumferential side of the intermediate portion closer to the closing section 88 than the first outer circumferential seal section 101 in the seal ring 89. The third outer circumferential seal section 103 is formed at an outer circumferential side of the base end portion closer to the closing section 88 than the second outer circumferential seal section 102 in the seal ring 89. All of the first outer circumferential seal section 101, the second outer circumferential seal section 102 and the third outer circumferential seal section 103 come in contact with the inner circumferential surface 67a of the inner circumferential portion 67 of the outer tube 13. Accordingly, the seal ring 89 is integrally formed with the outer circumferential side of the closing section 88 to come in contact with the inner circumferential surface 67a of the inner circumferential portion 67 of the outer tube 13.

The first inner circumferential abutting section 104 is formed at an inner circumferential side of the front end portion opposite to the closing section 88 in the seal ring 89. The second inner circumferential abutting section 105 is formed at an inner circumferential side of the intermediate portion closer to the closing section 88 than the first inner circumferential abutting section 104 in the seal ring 89. The third inner circumferential abutting section 106 is formed at an inner circumferential side of the base end portion closer to the closing section 88 than the second inner circumferential abutting section 105 in the seal ring 89. All of the first inner circumferential abutting section 104, the second inner circumferential abutting section 105 and the third inner circumferential abutting section 106 come in contact with the outer circumferential surface 76a of the outer circumferential portion 76 of the annular convex section 75 of the rod guide 25. Further, the first outer circumferential seal section 101, the second outer circumferential seal section 102 and the third outer circumferential seal section 103 should have a seal function with respect to the inner circumferential surface 67a of the inner circumferential portion 67 of the outer tube 13. However, the first inner circumferential abutting section 104, the second inner circumferential abutting section 105 and the third inner circumferential abutting section 106 may abut the outer circumferential surface 76a of the outer circumferential portion 76 of the annular convex section 75 of the rod guide 25 and may not have a seal function.

The first outer circumferential seal section 101 and the first inner circumferential abutting section 104 may overlap at positions in a direction (in the upward/downward direction of FIG. 2, hereinafter, referred to as a seal axial direction) of a central axis (hereinafter, referred to as a seal axis) of the seal member 26. Accordingly, the first outer circumferential seal section 101 and the first inner circumferential abutting section 104 are formed at outside and inside positions facing each other in the radial direction of the seal ring 89. The second outer circumferential seal section 102 and the second inner circumferential abutting section 105 overlap each other at positions in the seal axial direction. Accordingly, the second outer circumferential seal section 102 and the second inner circumferential abutting section 105 are formed at outside and inside positions facing each other in the radial direction of the seal ring 89. The third outer circumferential seal section 103 and the third inner circumferential abutting section 106 overlap each other at positions in the seal axial direction. Accordingly, the third outer circumferential seal section 103 and the third inner circumferential abutting section 106 are formed at outside and inside positions facing each other in the radial direction of the seal ring 89. Further, although it is preferable that the outer circumferential seal sections and the inner circumferential abutting sections overlap each other at positions in the seal axial direction, they may not be overlapped because sealability is improved more than the related art although a seal function is deteriorated.

A first outer circumferential convex section (a convex section) 111 protruding outward in the radial direction is formed at the first outer circumferential seal section 101. A second outer circumferential convex section (a convex section) 112 protruding outward in the radial direction is formed at the second outer circumferential seal section 102. A third outer circumferential convex section (a convex section) 113 protruding outward in the radial direction is formed at the third outer circumferential seal section 103. The first outer circumferential convex section 111 is formed at the first outer circumferential seal section 101 throughout the seal axial direction. The second outer circumferential convex section 112 is formed at the second outer circumferential seal section 102 throughout the seal axial direction. The third outer circumferential convex section 113 is formed at the third outer circumferential seal section 103 at a portion thereof close to the second outer circumferential convex section 112 in the seal axial direction.

The first outer circumferential convex section 111 has an annular shape about a seal axis. The first outer circumferential convex section 111 has an outer circumferential surface 111a opposite to the closing section 88 and an outer circumferential surface 111b close to the closing section 88.

The outer circumferential surface 111a is a tapered surface having a diameter reduced as it is separated from the closing section 88 in the seal axial direction. The outer circumferential surface 111b is a tapered surface having a diameter reduced as it approaches the closing section 88 in the seal axial direction. The outer circumferential surface 111a and the outer circumferential surface 111b are connected. These connected portions constitute a first maximum outer diameter section 111c having a maximum outer diameter in the first outer circumferential convex section 111. The first maximum outer diameter section 111c has an annular shape.

The second outer circumferential convex section 112 has an annular shape about the seal axis. The second outer circumferential convex section 112 has an outer circumferential surface 112a opposite to the closing section 88 and an outer circumferential surface 112b close to the closing section 88. The outer circumferential surface 112a has a tapered surface having a diameter reduced as it is separated from the closing section 88 in the seal axial direction. The outer circumferential surface 112b is a tapered surface having a diameter reduced as it approaches the closing section 88 in the seal axial direction. The outer circumferential surface 112a and the outer circumferential surface 112b are connected. These connected portions constitute a second maximum outer diameter section 112c having a maximum outer diameter in the second outer circumferential convex section 112. The second maximum outer diameter section 112c has an annular shape.

The outer circumferential surface 111b of the first outer circumferential convex section 111 and the outer circumferential surface 112a of the second outer circumferential convex section 112 are connected. A portion including the outer circumferential surface 111b of the first outer circumferential convex section 111 and a portion including the outer circumferential surface 112a of the second outer circumferential convex section 112 constitute a first outer circumferential concave section 114 recessed inward in the radial direction. A boundary portion between the outer circumferential surface 111b and the outer circumferential surface 112a is a first minimum outer diameter section 114a having a minimum outer diameter in the first outer circumferential concave section 114. The first outer circumferential concave section 114 also has an annular shape about the seal axis.

The third outer circumferential convex section 113 has an annular shape about the seal axis. The third outer circumferential convex section 113 has an outer circumferential surface 113a opposite to the closing section 88 and an outer circumferential surface 113b close to the closing section 88. The outer circumferential surface 113a has a tapered surface having a diameter reduced as it is separated from the closing section 88 in the seal axial direction. The outer circumferential surface 113b is a tapered surface having a diameter reduced as it approaches the closing section 88 in the seal axial direction. The outer circumferential surface 113a and the outer circumferential surface 113b are connected. These connected portions constitute a third maximum outer diameter section 113c having a maximum outer diameter in the third outer circumferential convex section 113. The third maximum outer diameter section 113c has an annular shape.

The outer circumferential surface 112b of the second outer circumferential convex section 112 and the outer circumferential surface 113a of the third outer circumferential convex section 113 are connected. A portion including the outer circumferential surface 112b of the second outer circumferential convex section 112 and a portion including the outer circumferential surface 113a of the third outer circumferential convex section 113 constitute a second outer circumferential concave section 115 recessed inward in the radial direction. A boundary portion between the outer circumferential surface 112b and the outer circumferential surface 113a is a second minimum outer diameter section 115a having a minimum outer diameter in the second outer circumferential concave section 115. The second outer circumferential concave section 115 also has an annular shape about the seal axis.

An outer circumferential surface 103a constituted by a cylindrical surface that connects the outer circumferential surface 113b of the third outer circumferential convex section 113 and an outer circumferential surface 94a of the outer circumferential seal 94 is formed at the third outer circumferential seal section 103. A step difference section 116 in which a closing section 88 side in the seal axial direction is disposed more inward in the radial direction than the opposite side of the closing section 88 is formed at the third outer circumferential seal section 103 by the outer circumferential surface 113b and the outer circumferential surface 103a.

The first maximum outer diameter section 111c, the second maximum outer diameter section 112c and the third maximum outer diameter section 113c have the same diameter. The first maximum outer diameter section 111c, the second maximum outer diameter section 112c and the third maximum outer diameter section 113c have a diameter larger than the inner circumferential surface 67a of the outer tube 13 that comes in contact therewith in an assembled state to an interference extent. The first maximum outer diameter section 111c, the second maximum outer diameter section 112c and the third maximum outer diameter section 113c are maximum outer diameter sections in the seal ring 89. Accordingly, an outer diameter of the seal ring 89 is larger than an inner diameter of the inner circumferential surface 67a of the inner circumferential portion 67 of the outer tube 13. All of the first outer circumferential convex section 111, the second outer circumferential convex section 112 and the third outer circumferential convex section 113 that protrude at the outer circumferential side come in contact with the inner circumferential portion 67 of the outer tube 13 and press the first inner circumferential abutting section 104, the second inner circumferential abutting section 105 and the third inner circumferential abutting section 106 inward in the radial direction. The first minimum outer diameter section 114a and the second minimum outer diameter section 115a have the same diameter, which is smaller than that of the inner circumferential surface 67a of the outer tube 13.

A first inner circumferential convex section (a convex section) 117 protruding inward in the radial direction is formed at the first inner circumferential abutting section 104. A second inner circumferential convex section (a convex section) 118 protruding inward in the radial direction is formed at the second inner circumferential abutting section 105. A third inner circumferential convex section (a convex section) 119 protruding inward in the radial direction is formed at the third inner circumferential abutting section 106. The first inner circumferential convex section 117 is formed at the first inner circumferential abutting section 104 throughout the seal axial direction. The second inner circumferential convex section 118 is formed at the second inner circumferential abutting section 105 throughout the seal axial direction. The third inner circumferential convex section 119 is formed at the third inner circumferential abutting section 106 in a portion of a second inner circumferential convex section 118 side in the seal axial direction.

The first inner circumferential convex section 117 has an annular shape about the seal axis. The first inner circumferential convex section 117 has an inner circumferential surface 117a opposite to the closing section 88 and an inner circumferential surface 117b close to the closing section 88. The inner circumferential surface 117a is a tapered surface having a diameter increased as it is separated from the closing section 88 in the seal axial direction. The inner circumferential surface 117b is a tapered surface having a diameter increased as it approaches the closing section 88 in the seal axial direction. The inner circumferential surface 117a and the inner circumferential surface 117b are connected. These connected portions constitute a first minimum inner diameter section 117c having a minimum inner diameter in the first inner circumferential convex section 117. The first minimum inner diameter section 117c has an annular shape.

An end portion opposite to the closing section 88 of the inner circumferential surface 117a of the first inner circumferential convex section 117 and an end portion opposite to the closing section 88 of the outer circumferential surface 111a of the first outer circumferential convex section 111 are connected. These portions constitute a foremost end portion 89a that is furthest separated from the closing section 88 in the seal ring 89. A diameter of the foremost end portion 89a is smaller than that of the maximum outer diameter sections 111c, 112c and 113c and smaller than that of the minimum outer diameter sections 114a and 115a.

The second inner circumferential convex section 118 has an annular shape about the seal axis. The second inner circumferential convex section 118 has an inner circumferential surface 118a opposite to the closing section 88 and an inner circumferential surface 118b close to the closing section 88. The inner circumferential surface 118a is a tapered surface having a diameter increased as it is separated from the closing section 88 in the seal axial direction. The inner circumferential surface 118b is a tapered surface having a diameter increased as it approaches the closing section 88 in the seal axial direction. The inner circumferential surface 118a and the inner circumferential surface 118b are connected. These connected portions constitute a second minimum inner diameter section 118c having a minimum inner diameter in the second inner circumferential convex section 118. The second minimum inner diameter section 118c has an annular shape.

The inner circumferential surface 117b of the first inner circumferential convex section 117 and the inner circumferential surface 118a of the second inner circumferential convex section 118 are connected. A portion including the inner circumferential surface 117b of the first inner circumferential convex section 117 and a portion including the inner circumferential surface 118a of the second inner circumferential convex section 118 constitute a first inner circumferential concave section 120 recessed outward in the radial direction. A boundary portion between the inner circumferential surface 117b and the inner circumferential surface 118a is a first maximum inner diameter section 120a having a maximum inner diameter in the first inner circumferential concave section 120. The first inner circumferential concave section 120 also has an annular shape about the seal axis.

The third inner circumferential convex section 119 has an annular shape about the seal axis. The third inner circumferential convex section 119 has an inner circumferential surface 119a opposite to the closing section 88 and an inner circumferential surface 119b close to the closing section 88. The inner circumferential surface 119a is a tapered surface having a diameter increased as it is separated from the closing section 88 in the seal axial direction. The inner circumferential surface 119b is a tapered surface having a diameter increased as it approaches the closing section 88 in the seal axial direction. The inner circumferential surface 119a and the inner circumferential surface 119b are connected. These connected portions constitute a third minimum inner diameter section 119c having a minimum inner diameter in the third inner circumferential convex section 119. The third minimum inner diameter section 119c has an annular shape.

The inner circumferential surface 118b of the second inner circumferential convex section 118 and the inner circumferential surface 119a of the third inner circumferential convex section 119 are connected. A portion including the inner circumferential surface 118b of the second inner circumferential convex section 118 and a portion including the inner circumferential surface 119a of the third inner circumferential convex section 119 constitutes a second inner circumferential concave section 121 recessed outward in the radial direction. A boundary portion between the inner circumferential surface 118b and the inner circumferential surface 119a is a second maximum inner diameter section 121a having a maximum inner diameter in the second inner circumferential concave section 121. The second inner circumferential concave section 121 also has an annular shape about the seal axis.

A curved inner circumferential surface 106a that connects the inner circumferential surface 119b of the third inner circumferential convex section 119 and a surface 95a of the end surface seal 95 is formed at the third inner circumferential abutting section 106. A portion including the inner circumferential surface 119b of the third inner circumferential convex section 119 and a portion including the curved inner circumferential surface 106a of the third inner circumferential abutting section 106 constitute a third inner circumferential concave section 122 recessed outward in the radial direction. The third inner circumferential concave section 122 also has an annular shape about the seal axis.

The second minimum inner diameter section 118c has a diameter smaller than that of the first minimum inner diameter section 117c. The third minimum inner diameter section 119c has a diameter smaller than that of the second minimum inner diameter section 118c. The second maximum inner diameter section 121a has a diameter smaller than that of the first maximum inner diameter section 120a. In the embodiment, the first minimum inner diameter section 117c, the second minimum inner diameter section 118c and the third minimum inner diameter section 119c are disposed on, for example, the same tapered surface.

The first minimum inner diameter section 117c has a diameter smaller than an outer diameter of a portion of the outer circumferential portion 76 of the rod guide 25 in which the first minimum inner diameter section 117c matches a position in the seal axial direction. The second minimum inner diameter section 118c has a diameter smaller than an outer diameter of a portion of the outer circumferential portion 76 of the rod guide 25 in which the second minimum inner diameter section 118c matches a position in the seal axial direction. The third minimum inner diameter section 119c has a diameter smaller than an outer diameter of a portion of the outer circumferential portion 76 of the rod guide 25 in which the third minimum inner diameter section 119c matches a position in the seal axial direction. A diameter difference between the portion of the outer circumferential portion 76 in which the second minimum inner diameter section 118c matches the position in the seal axial direction and the second minimum inner diameter section 118c is larger than a diameter difference between the portion of the outer circumferential portion 76 in which the first minimum inner diameter section 117c matches the position in seal axial direction and the first minimum inner diameter section 117c. A diameter difference between the portion of the outer circumferential portion 76 in which the third minimum inner diameter section 119c matches the position in the seal axial direction and the third minimum inner diameter section 119c is larger than a diameter difference between the portion of the outer circumferential portion 76 in which the second minimum inner diameter section 118c matches the position in the seal axial direction and the second minimum inner diameter section 118c.

All of the first inner circumferential convex section 117, the second inner circumferential convex section 118 and the third inner circumferential convex section 119 that protrude at the inner circumferential side come in contact with the outer circumferential portion 76 of the rod guide 25 to press the first outer circumferential seal section 101, the second outer circumferential seal section 102 and the third outer circumferential seal section 103 outward in the radial direction. A taper amount (an outer diameter difference per unit axial length) of the tapered surface including the first minimum inner diameter section 117c, the second minimum inner diameter section 118c and the third minimum inner diameter section 119c is larger than that of the outer circumferential surface 76a of the outer circumferential portion 76 of the rod guide 25.

The first maximum outer diameter section 111c and the first minimum inner diameter section 117c are overlapped at a position in the seal axial direction. Accordingly, the first outer circumferential convex section 111 and the first inner circumferential convex section 117 are overlapped at a position in the seal axial direction. The second maximum outer diameter section 112c and the second minimum inner diameter section 118c are overlapped at a position in the seal axial direction. Accordingly, the second outer circumferential convex section 112 and the second inner circumferential convex section 118 are overlapped at the position in the seal axial direction. The third maximum outer diameter section 113c and the third minimum inner diameter section 119c are overlapped at a position in the seal axial direction. Accordingly, the third outer circumferential convex section 113 and the third inner circumferential convex section 119 match at the position in the seal axial direction.

Here, when the first outer circumferential seal section 101 becomes a front end side outer circumferential seal section formed at a side of the seal ring 89 opposite to the closing section 88, the second outer circumferential seal section 102 and the third outer circumferential seal section 103 become a base end side outer circumferential seal section formed closer to the closing section 88 than the front end side outer circumferential seal section. In this case, the first outer circumferential convex section 111 formed at the first outer circumferential seal section 101 becomes a front end side outer circumferential convex section formed at the front end side outer circumferential seal section, and the second outer circumferential convex section 112 and the third outer circumferential convex section 113 formed at the second outer circumferential seal section 102 and the third outer circumferential seal section 103 become a base end side outer circumferential convex section formed at the base end side outer circumferential seal section.

In addition, when the second outer circumferential seal section 102 becomes a front end side outer circumferential seal section formed at a side of the seal ring 89 opposite to the closing section 88, the third outer circumferential seal section 103 becomes a base end side outer circumferential seal section formed closer to the closing section 88 than the front end side outer circumferential seal section. In this case, the second outer circumferential convex section 112 formed at the second outer circumferential seal section 102 becomes a front end side outer circumferential convex section formed at the front end side outer circumferential seal section, and the third outer circumferential convex section 113 formed at the third outer circumferential seal section 103 becomes a base end side outer circumferential convex section formed at the base end side outer circumferential seal section.

In addition, when the first inner circumferential abutting section 104 becomes a front end side inner circumferential abutting section formed at a side of the seal ring 89 opposite to the closing section 88, the second inner circumferential abutting section 105 and the third inner circumferential abutting section 106 become a base end side inner circumferential abutting section formed closer to the closing section 88 than the front end side inner circumferential abutting section.

In this case, the first inner circumferential convex section 117 formed at the first inner circumferential abutting section 104 becomes a front end side inner circumferential convex section formed at the front end side inner circumferential abutting section, and the second inner circumferential convex section 118 and the third inner circumferential convex section 119 formed at the second inner circumferential abutting section 105 and the third inner circumferential abutting section 106 become a base end side inner circumferential convex section formed at the base end side inner circumferential abutting section.

In addition, when the second inner circumferential abutting section 105 becomes a front end side inner circumferential abutting section formed at an opposite side of the closing section 88, the third inner circumferential abutting section 106 becomes a base end side inner circumferential abutting section formed closer to the closing section 88 than the front end side inner circumferential abutting section. In this case, the second inner circumferential convex section 118 formed at the second inner circumferential abutting section 105 becomes a front end side inner circumferential convex section formed at the front end side inner circumferential abutting section, and the third inner circumferential convex section 119 formed at the third inner circumferential abutting section 106 becomes a base end side inner circumferential convex section formed at the base end side inner circumferential abutting section.

When the seal member 26 is assembled to the cylinder 11, as a preceding step thereof, in a state in which the locking section 33 of the outer tube 13 is disposed on an extension line of the trunk section 30, the base valve 28 is disposed at the bottom portion 31 of the outer tube 13 and the inner tube 12 is fit into the base valve 28. In addition, the rod 22 to which the piston 17 is attached causes the piston 17 to be fit into the inner tube 12. In addition, the rod guide 25 is fit onto the rod 22, and the rod guide 25 causes the small diameter outer circumferential portion 65 to be fit into the inner tube 12 and the large diameter outer circumferential portion 64 to be fit into the outer tube 13. In this way, the rod guide 25 is positioned with respect to the outer tube 13.

Figure 3:
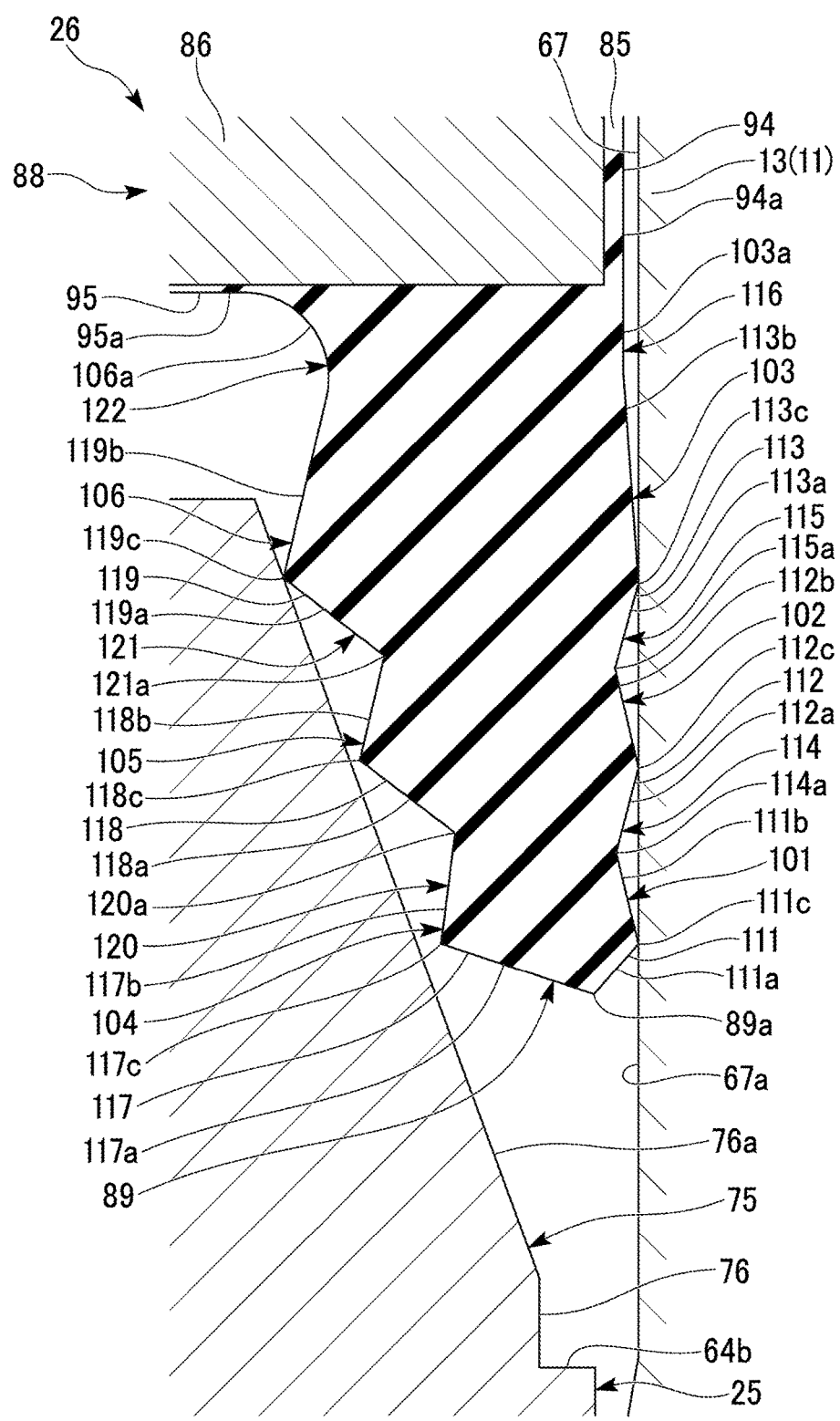
FIG. 3 is a partially enlarged cross-sectional view showing a state in the middle of assembly of a seal member that shows the major part of the cylinder device according to the embodiment of the present invention.

When the seal member 26 is assembled to the cylinder 11, the seal member 26 including the seal ring 89 is fit into the outer tube 13 of the cylinder 11 in the above-mentioned state. Then, as shown in FIG. 3, the seal ring 89 is inserted between the outer circumferential portion 76 of the annular convex section 75 of the rod guide 25 and the inner circumferential portion 67 of the outer tube 13. Here, in the seal ring 89, the first outer circumferential convex section 111, the second outer circumferential convex section 112 and the third outer circumferential convex section 113 are fit into the inner circumferential surface 67a of the inner circumferential portion 67. Then, the first maximum outer diameter section 111c, the second maximum outer diameter section 112c and the third maximum outer diameter section 113c come in contact with the inner circumferential surface 67a and are pressed by the inner circumferential portion 67 to become a state in which they are elastically deformed inward in the radial direction, i.e., a compression direction.

As described above, a taper amount of the tapered surface including the first minimum inner diameter section 117c of the first inner circumferential convex section 117, the second minimum inner diameter section 118c of the second inner circumferential convex section 118 and the third minimum inner diameter section 119c of the third inner circumferential convex section 119 is larger than that of the outer circumferential surface 76a of the outer circumferential portion 76 of the rod guide 25 with which they come in contact. For this reason, as shown in FIG. 3, when the seal ring 89 is inserted between the outer circumferential portion 76 of the annular convex section 75 of the rod guide 25 and the inner circumferential portion 67 of the outer tube 13, first, the third inner circumferential convex section 119 of the third inner circumferential abutting section 106 is in a state coming in contact with the outer circumferential surface 76a of the outer circumferential portion 76 of the rod guide 25 in the third minimum inner diameter section 119c. When insertion of the seal ring 89 further advances from this state, the third inner circumferential convex section 119 is pressed outward in the radial direction by the outer circumferential surface 76a of the outer circumferential portion 76 of the rod guide 25 to be gradually elastically deformed outward in the radial direction, i.e., the compression direction.

When the insertion further advances after contact of the third minimum inner diameter section 119c with the outer circumferential portion 76 of the rod guide 25, the second inner circumferential convex section 118 of the second inner circumferential abutting section 105 is in a state coming in contact with the outer circumferential surface 76a of the outer circumferential portion 76 of the rod guide 25 in the second minimum inner diameter section 118c. When the insertion of the seal ring 89 further advances from this state, the second inner circumferential convex section 118 is pressed outward in the radial direction by the outer circumferential surface 76a of the outer circumferential portion 76 of the rod guide 25 to be gradually elastically deformed outward in the radial direction, i.e., the compression direction.

When the insertion further advances after contact of the second minimum inner diameter section 118c with the outer circumferential portion 76 of the rod guide 25, the first inner circumferential convex section 117 of the first inner circumferential abutting section 104 is in a state coming in contact with the outer circumferential surface 76a of the outer circumferential portion 76 of the rod guide 25 in the first minimum inner diameter section 117c. When the insertion of the seal ring 89 further advances from this state, the first inner circumferential convex section 117 is pressed outward in the radial direction by the outer circumferential surface 76a of the outer circumferential portion 76 of the rod guide 25 to be gradually elastically deformed outward in the radial direction, i.e., the compression direction.

Then, finally, all of the first outer circumferential convex section 111, the second outer circumferential convex section 112 and the third outer circumferential convex section 113 are elastically deformed in the compression direction so that the first outer circumferential seal section 101, the second outer circumferential seal section 102 and the third outer circumferential seal section 103 are adhered to the inner circumferential surface 67a of the inner circumferential portion 67 of the outer tube 13 without a gap, and all of the first inner circumferential convex section 117, the second inner circumferential convex section 118 and the third inner circumferential convex section 119 are elastically deformed in the compression direction so that the first inner circumferential abutting section 104, the second inner circumferential abutting section 105 and the third inner circumferential abutting section 106 are adhered to the outer circumferential surface 76a of the outer circumferential portion 76 of the rod guide 25 without a gap. In this state, the first outer circumferential convex section 111, the second outer circumferential convex section 112 and the third outer circumferential convex section 113 press the first inner circumferential abutting section 104, the second inner circumferential abutting section 105 and the third inner circumferential abutting section 106 inward in the radial direction to become a state being pressed against the outer circumferential surface 76a of the outer circumferential portion 76 of the rod guide 25. In addition, the first inner circumferential convex section 117, the second inner circumferential convex section 118 and the third inner circumferential convex section 119 press the first outer circumferential seal section 101, the second outer circumferential seal section 102 and the third outer circumferential seal section 103 outward in the radial direction to become a state being pressed against the inner circumferential surface 67a of the inner circumferential portion 67 of the outer tube 13.

Accordingly, when the seal ring 89 is inserted between the outer circumferential portion 76 of the rod guide 25 and the inner circumferential portion 67 of the outer tube 13, before a state in which the second inner circumferential convex section 118 of the second inner circumferential abutting section 105 comes in contact with the rod guide 25 and the second outer circumferential convex section 112 of the second outer circumferential seal section 102 comes in contact with the inner circumferential portion 67 of the outer tube 13, the third inner circumferential convex section 119 of the third inner circumferential abutting section 106 comes in contact with the rod guide 25 and the third outer circumferential convex section 113 of the third outer circumferential seal section 103 comes in contact with the inner circumferential portion 67 of the outer tube 13. In addition, before a state in which the first inner circumferential convex section 117 of the first inner circumferential abutting section 104 comes in contact with the rod guide 25 and the first outer circumferential convex section 111 of the first outer circumferential seal section 101 comes in contact with the inner circumferential portion 67 of the outer tube 13, the second inner circumferential convex section 118 of the second inner circumferential abutting section 105 comes in contact with the rod guide 25 and the second outer circumferential convex section 112 of the second outer circumferential seal section 102 comes in contact with the inner circumferential portion 67 of the outer tube 13.

When the seal member 26 is disposed in the outer tube 13 as described above, an extension portion of the outer tube 13 opposite to the bottom portion 31 of the trunk section 30 is bent inward in the radial direction from the trunk section 30 to form the locking section 33. A portion of the locking section 33 in which the annular member 86 in the radial direction of the closing section 88 is disposed is sandwiched between the annular convex section 75 of the rod guide 25 and the annular member 86. Accordingly, the seal member 26 is assembled to the cylinder 11.

Further, even when the first minimum inner diameter section 117c, the second minimum inner diameter section 118c and the third minimum inner diameter section 119c are not disposed on the same tapered surface, the taper amount of the tapered surface including the first minimum inner diameter section 117c and the second minimum inner diameter section 118c and the taper amount of the tapered surface including the second minimum inner diameter section 118c and the third minimum inner diameter section 119c may be larger than the taper amount of the outer circumferential surface 76a of the outer circumferential portion 76 of the rod guide 25. That is, a taper amount of all combinations of the inner circumferential convex sections neighboring in the seal axial direction may be larger than the taper amount of the tapered surfaces with which the convex sections come in contact.

The cylinder device of the above-mentioned Patent Literature 1 includes an annular closing section formed at a lid further outward in the cylinder radial direction than the rod guide to close one end side of the cylinder, and an annular seal ring formed inward in the cylinder radial direction from the outer circumferential side of the closing section to come in contact with a tapered outer circumferential portion of the rod guide and an inner circumferential portion of the cylinder. The seal ring is pushed into the tapered outer circumferential portion and the inner circumferential portion of the cylinder to be elastically deformed in the radial direction, i.e., the compression direction, to be adhered to the tapered outer circumferential portion and the inner circumferential portion to perform sealing of a gap therebetween. In such a structure, in order to improve sealability of the outer circumferential portion of the rod guide and the inner circumferential portion of the cylinder, it is considered to increase a volume of the seal ring. However, when the volume of the seal ring is increased, the seal ring may be hard to enter the gap and assembly to the cylinder device may become difficult.

On the other hand, in the cylinder device of the embodiment, the first outer circumferential convex section 111 protruding in the radial direction is formed at the first outer circumferential seal section 101. The second outer circumferential convex section 112 protruding in the radial direction is formed at the second outer circumferential seal section 102. The third outer circumferential convex section 113 protruding in the radial direction is formed at the third outer circumferential seal section 103. In addition, the first inner circumferential convex section 117 protruding in the radial direction is formed at the first inner circumferential abutting section 104. The second inner circumferential convex section 118 protruding in the radial direction is formed at the second inner circumferential abutting section 105. The third inner circumferential convex section 119 protruding in the radial direction is formed at the third inner circumferential abutting section 106. Accordingly, as the volume is partially increased in the seal axial direction, even when sealability is improved, an increase in a frictional resistance of the outer tube 13 to the inner circumferential portion 67 and a frictional resistance of the rod guide 25 to the outer circumferential portion 76 can be suppressed. Accordingly, assembly property of the seal member 26 including the seal ring 89 can be improved.

In addition, the first outer circumferential convex section 111, the second outer circumferential convex section 112 and the third outer circumferential convex section 113 that have a plurality of stages are formed. In addition, the first inner circumferential convex section 117, the second inner circumferential convex section 118 and the third inner circumferential convex section 119 that have a plurality of stages are formed. For this reason, even when foreign substances such as chips or the like are intruded between the seal ring 89 and the inner circumferential portion 67 of the outer tube 13 or the outer circumferential portion 76 of the rod guide 25, a portion that receives influence that is affected by the foreign substances and a portion that does not receive the influence that is not affected by the foreign substances can be separated. For example, even when any one of the first outer circumferential convex section 111, the second outer circumferential convex section 112 and the third outer circumferential convex section 113 is deformed by the foreign substances, the remaining two convex sections can receive less of the influence and can secure the sealability. Similarly, even when any one of the first inner circumferential convex section 117, the second inner circumferential convex section 118 and the third inner circumferential convex section 119 is deformed by the foreign substances, the remaining two convex sections can receive less of the influence and can secure the sealability. The intrusion of the foreign substances is extremely rare, and even when the foreign substances are intruded to deteriorate the sealability of the seal ring, the foreign substances can be found by inspection before delivery. However, since the cylinder device in which sealability of the seal ring is deteriorated cannot be delivered, a yield is decreased. On the other hand, since the cylinder device 10 of the embodiment can suppress a decrease in sealability of the seal ring 89 even when the foreign substances are intruded, the yield can be improved. Further, even when the foreign substances are mixed, the foreign substances can be stopped on the first outer circumferential concave section 114 and the second outer circumferential concave section 115, and the decrease in sealability of the seal ring 89 can be suppressed.

In addition, the first inner circumferential convex section 117 is formed at the first inner circumferential abutting section 104. The second inner circumferential convex section 118 is formed at the second inner circumferential abutting section 105. The third inner circumferential convex section 119 is formed at the third inner circumferential abutting section 106. The first inner circumferential convex section 117, the second inner circumferential convex section 118 and the third inner circumferential convex section 119 abut the outer circumferential portion 76 of the rod guide 25 to press the first outer circumferential seal section 101, the second outer circumferential seal section 102 and the third outer circumferential seal section 103 outward in the radial direction. For this reason, an adhesion level of the first outer circumferential seal section 101, the second outer circumferential seal section 102 and the third outer circumferential seal section 103 to the inner circumferential portion 67 of the outer tube 13 is increased. Accordingly, sealability of the outer tube 13 to the inner circumferential portion 67 side can be improved.

In addition, when the seal ring 89 is inserted between the inner circumferential portion 67 of the outer tube 13 and the outer circumferential portion 76 of the rod guide 25, before a state in which the second inner circumferential convex section 118 of the second inner circumferential abutting section 105 comes in contact with the rod guide 25 and the second outer circumferential convex section 112 of the second outer circumferential seal section 102 comes in contact with the inner circumferential portion 67 of the outer tube 13, the third inner circumferential convex section 119 of the third inner circumferential abutting section 106 closer to the base end than these comes in contact with the rod guide 25 and the third outer circumferential convex section 113 of the third outer circumferential seal section 103 comes in contact with the inner circumferential portion 67 of the outer tube 13. In addition, before a state in which the first inner circumferential convex section 117 of the first inner circumferential abutting section 104 comes in contact with the rod guide 25 and the first outer circumferential convex section 111 of the first outer circumferential seal section 101 comes in contact with the inner circumferential portion 67 of the outer tube 13, the second inner circumferential convex section 118 of the second inner circumferential abutting section 105 closer to the base end than these comes in contact with the rod guide 25 and the second outer circumferential convex section 112 of the second outer circumferential seal section 102 comes in contact with the inner circumferential portion 67 of the outer tube 13. For this reason, the seal ring 89 can be smoothly inserted between the inner circumferential portion 67 of the outer tube 13 and the outer circumferential portion 76 of the rod guide 25 upon assembly of the seal member 26. That is, an early deformation of the front end side of the seal ring 89 caused by being hooked by the outer circumferential portion 76 of the rod guide 25 can be suppressed. Accordingly, the sealability can be further improved.

In addition, when the seal ring 89 is inserted between the inner circumferential portion 67 of the outer tube 13 and the outer circumferential portion 76 of the rod guide 25, the third inner circumferential convex section 119 is compressed and deformed earlier than the second inner circumferential convex section 118. Accordingly, the second inner circumferential convex section 118 and the first inner circumferential convex section 117 in front of the third inner circumferential convex section 119 are pushed forward. Similarly, as the second inner circumferential convex section 118 is compressed and deformed earlier than the first inner circumferential convex section 117, the first inner circumferential convex section 117 in front of the second inner circumferential convex section 118 is pushed forward. Accordingly, interference is increased while the seal ring 89 is appropriately inserted between the inner circumferential portion 67 of the outer tube 13 and the outer circumferential portion 76 of the rod guide 25. Accordingly, sealability can be further improved.

Further, when a seal function is not provided in the first inner circumferential abutting section 104, the second inner circumferential abutting section 105 and the third inner circumferential abutting section 106, the assembly property can be further improved.

In addition, the first outer circumferential convex section 111 is formed at the first outer circumferential seal section 101. The second outer circumferential convex section 112 is formed at the second outer circumferential seal section 102. The third outer circumferential convex section 113 is formed at the third outer circumferential seal section 103. The first outer circumferential convex section 111, the second outer circumferential convex section 112 and the third outer circumferential convex section 113 can come in contact with the inner circumferential portion 67 of the outer tube 13 to press the first inner circumferential abutting section 104, the second inner circumferential abutting section 105 and the third inner circumferential abutting section 106 inward in the radial direction. For this reason, an adhesion level of the first inner circumferential abutting section 104, the second inner circumferential abutting section 105 and the third inner circumferential abutting section 106 to the outer circumferential portion 76 of the rod guide 25 is increased. Accordingly, sealability of the rod guide 25 to an outer circumferential portion 76 side can be improved.

In addition, since the seal ring 89 is integrally formed with the closing section 88, the seal ring 89 can be simultaneously assembled to the closing section 88. Accordingly, assembly becomes easier.

In addition, since the outer diameter of the seal ring 89 is larger than the inner diameter of the inner circumferential portion 67 of the outer tube 13, an adhesion level of the seal ring 89 to the inner circumferential portion 67 of the outer tube 13 can be improved, and sealability of the outer tube 13 to the inner circumferential portion 67 side can be improved.

In addition, the outer circumferential surface 76a serving as a contact surface of the rod guide 25 with the seal ring 89 is a tapered surface. For this reason, a structure in which the third inner circumferential convex section 119 comes in contact with the rod guide 25 before a state in which the second inner circumferential convex section 118 comes in contact with the rod guide 25, and the second inner circumferential convex section 118 comes in contact with the rod guide 25 before a state in which the first inner circumferential convex section 117 comes in contact with the rod guide 25 can be easily realized.

In the above-mentioned embodiment, while the seal ring 89 and the closing section 88 are provided as an integral seal member 26, the seal ring 89 and the closing section 88 may be separate members. In addition, while all of the outer circumferential seal sections 101 to 103 and the inner circumferential abutting sections 104 to 106 have a configuration in which the convex sections protrude in the radial direction, at least one of the outer circumferential seal sections 101 to 103 and the inner circumferential abutting sections 104 to 106 may have a convex section that protrudes in the radial direction. That is, the embodiment may be modified into a configuration in which the inner circumferential convex sections 117 to 119 are formed at the inner circumferential abutting sections 104 to 106 without forming the outer circumferential convex sections 111 to 113 at the outer circumferential seal sections 101 to 103, or the outer circumferential convex sections 111 to 113 are formed at the outer circumferential seal sections 101 to 103 without forming the inner circumferential convex sections 117 to 119 at the inner circumferential abutting sections 104 to 106. Of course, the outer circumferential convex sections are not limited to three places but may be two or four or more places as long as the convex sections are provided at a plurality of places. The inner circumferential convex sections are also not limited to three places but may be two or four or more places as long as the convex sections are provided at a plurality of places. In addition, while the rod guide 25 configured to guide the rod 22 has been exemplarily described as the annular member that comes in contact with the seal ring 89, an annular member that does not come in contact with the rod 22 such as a seal case or the like may be provided.

In addition, in the above-mentioned embodiment, while the double cylinder type hydraulic shock absorber is shown as the cylinder device, the present invention may be applied to a cylinder device such as a single cylinder type hydraulic shock absorber, an active suspension, or the like. Further, the present invention may also be applied to a cylinder device such as a gas pressure shock absorber or the like. In addition, the present invention may be applied to a cylinder device of a type in which rods protrude from both sides in the axial direction of the cylinder. That is, the present invention may be applied to a cylinder device of a type in which a rod protrudes from at least one end of the cylinder.

According to the above-mentioned embodiment, the cylinder device includes a cylinder in which a working fluid is enclosed, a rod protruding from at least one end of the cylinder, an annular member formed at one end side of the cylinder, an annular closing section formed further outward in a cylinder inward/outward direction than the annular member to close the one end side of the cylinder, and an annular seal ring provided inward in the cylinder inward/outward direction from an outer circumferential side of the closing section to come in contact with an outer circumferential portion of the annular member and an inner circumferential portion of the cylinder. The seal ring includes a front end side outer circumferential seal section formed at an outer circumferential side opposite to the closing section to come in contact with the inner circumferential portion of the cylinder, a base end side outer circumferential seal section formed at the outer circumferential side closer to the closing section than the front end side outer circumferential seal section to come in contact with the inner circumferential portion of the cylinder, a front end side inner circumferential abutting section formed at the inner circumferential side opposite to the closing section to come in contact with the outer circumferential portion of the annular member, and a base end side inner circumferential abutting section formed at the inner circumferential side closer to the closing section than the front end side inner circumferential abutting section to come in contact with the outer circumferential portion of the annular member. At least one set of seal sections or abutting sections of the front end side outer circumferential seal section and the base end side outer circumferential seal section, and the front end side inner circumferential abutting section and the base end side inner circumferential abutting section is constituted by convex sections protruding in a radial direction. Accordingly, since the volume of the seal ring is partially increased in an axial direction, even when sealability is improved, an increase in a frictional resistance to the inner circumferential portion of the cylinder and a frictional resistance of the outer circumferential portion of the annular member can be suppressed. Accordingly, an assembly property of the seal ring can be improved.

In addition, the convex sections are a front end side inner circumferential convex section formed at the front end side inner circumferential abutting section and a base end side inner circumferential convex section formed at the base end side inner circumferential abutting section. The convex sections come in contact with the outer circumferential portion of the annular member to press the front end side outer circumferential seal section and the base end side outer circumferential seal section outward in the radial direction. For this reason, an adhesion level of the front end side outer circumferential seal section and the base end side outer circumferential seal section to the inner circumferential portion of the cylinder is increased. Accordingly, sealability of the inner circumferential portion side of the cylinder can be improved.

In addition, shapes of the seal ring is formed such that, when the seal ring is inserted between the outer circumferential portion of the annular member and the inner circumferential portion of the cylinder, the base end side inner circumferential convex section comes in contact with the annular member before the front end side inner circumferential convex section comes in contact with the annular member. For this reason, the seal ring can be smoothly inserted between the inner circumferential portion of the cylinder and the outer circumferential portion of the annular member upon assembly.

In addition, shapes of the seal ring is formed such that, when the seal ring is inserted between the outer circumferential portion of the annular member and the inner circumferential portion of the cylinder, before a state in which the front end side inner circumferential convex section comes in contact with the annular member and the front end side outer circumferential seal section comes in contact with the inner circumferential portion of the cylinder, the base end side inner circumferential convex section comes in contact with the annular member and the base end side outer circumferential seal section comes in contact with the inner circumferential portion of the cylinder. For this reason, the seal ring can be smoothly inserted between the inner circumferential portion of the cylinder and the outer circumferential portion of the annular member upon assembly.

In addition, the convex sections are a front end side outer circumferential convex section formed at the front end side outer circumferential seal section and a base end side outer circumferential convex section formed at the base end side outer circumferential seal section. The convex sections come in contact with the inner circumferential portion of the cylinder to press the front end side inner circumferential abutting section and the base end side inner circumferential abutting section inward in the radial direction. For this reason, an adhesion level of the front end side inner circumferential abutting section and the base end side inner circumferential abutting section to the outer circumferential portion of the annular member is increased. Accordingly, sealability of the outer circumferential portion side of the annular member can be improved.

In addition, the seal ring is integrally formed with the closing section. For this reason, the seal ring can be assembled simultaneously with the closing section. Accordingly, assembly becomes easier.

In addition, an outer diameter of the seal ring is larger than an inner diameter of the inner circumferential portion of the cylinder. Accordingly, since the adhesion level of the seal ring to the inner circumferential portion of the cylinder can be improved, sealability of the inner circumferential portion side of the cylinder can be improved.

In addition, a contact surface of the annular member with the seal ring is a tapered surface. Accordingly, upon insertion of the seal ring between the outer circumferential portion of the annular member and the inner circumferential portion of the cylinder, a structure in which the base end side inner circumferential convex section comes in contact with the annular member before the front end side inner circumferential convex section comes in contact with the annular member can be easily realized.

In addition, the front end side outer circumferential seal section and the front end side inner circumferential abutting section, and the base end side outer circumferential seal section and the base end side inner circumferential abutting section overlap each other at positions in the axial direction.

According to the above-mentioned embodiment, the seal member comes in contact with the annular inner circumferential portion and the annular member formed in the inner circumferential portion to seal the inner circumferential portion. The seal member is constituted by an annular closing section disposed coaxially with the annular member, and an annular seal ring integrally formed with the outer circumferential side of the closing section to come in contact with the inner circumferential portion. The seal ring has a front end side outer circumferential seal section formed at the outer circumferential side to come in contact with the inner circumferential portion, a base end side outer circumferential seal section formed at the outer circumferential side closer to the closing section than the front end side outer circumferential seal section to come in contact with the inner circumferential portion, a front end side inner circumferential convex section protruding at the inner circumferential side to come in contact with the outer circumferential portion of the annular member to press the front end side outer circumferential seal section outward in the radial direction, and a base end side inner circumferential convex section protruding at the inner circumferential side closer to the closing section than the front end side inner circumferential convex section to come in contact with the outer circumferential portion of the annular member to press the base end side outer circumferential seal section outward in the radial direction. Accordingly, an assembly property of the seal ring can be improved.

INDUSTRIAL APPLICABILITY

According to the above-mentioned cylinder device and seal member, an assembly property of the seal ring can be improved.

REFERENCE SIGNS LIST 10 cylinder device
11 cylinder
22 rod
25 rod guide (annular member)
26 seal member
67 inner circumferential portion
76 outer circumferential portion
76a outer circumferential surface (contact surface)
88 closing section
89 seal ring
101 first outer circumferential seal section
102 second outer circumferential seal section
103 third outer circumferential seal section
104 first inner circumferential abutting section
105 second inner circumferential abutting section
106 third inner circumferential abutting section
111 first outer circumferential convex section (convex section)
112 second outer circumferential convex section (convex section)
113 third outer circumferential convex section (convex section)
117 first inner circumferential convex section (convex section)
118 second inner circumferential convex section (convex section)
119 third inner circumferential convex section (convex section)

The invention claimed is:
1. A cylinder device comprising:
a cylinder in which a working fluid is enclosed;
a rod protruding from at least one end of the cylinder;
a rod guide formed at one end side of the cylinder;
an annular closing section formed further outward in a cylinder inward/outward direction than the rod guide to close the one end side of the cylinder; and
an annular seal ring provided inward in the cylinder inward/outward direction from an outer circumferential side of the annular closing section to come in contact with an outer circumferential portion of the rod guide and an inner circumferential portion of the cylinder,
wherein the seal ring includes:
a front end side outer circumferential seal section formed at an outer circumferential side to come in contact with the inner circumferential portion of the cylinder;
a base end side outer circumferential seal section formed at the outer circumferential side closer to the closing section than the front end side outer circumferential seal section to come in contact with the inner circumferential portion of the cylinder;
a front end side inner circumferential abutting section formed at the inner circumferential side to come in contact with the outer circumferential portion of the rod guide; and
a base end side inner circumferential abutting section formed at the inner circumferential side closer to the closing section than the front end side inner circumferential abutting section to come in contact with the outer circumferential portion of the rod guide,
wherein the front end side inner circumferential abutting section and the base end side inner circumferential abutting section are constituted by convex sections protruding in a radial direction,
wherein the convex sections are a front end side inner circumferential convex section formed at the front end side inner circumferential abutting section and a base end side inner circumferential convex section formed at the base end side inner circumferential abutting section, and
wherein the convex sections are configured to come in contact with the outer circumferential portion of the rod guide to thereby press the front end side outer circumferential seal section and the base end side outer circumferential seal section outward in the radial direction.

2. The cylinder device according to claim 1, the seal ring is shaped such that, upon insertion of the seal ring between the outer circumferential portion of the rod guide and the inner circumferential portion of the cylinder, the base end side inner circumferential convex section comes in contact with the rod guide before the front end side inner circumferential convex section comes in contact with the rod guide.

3. The cylinder device according to claim 1, wherein the seal ring is shaped such that, upon insertion of the seal ring between the outer circumferential portion of the rod guide and the inner circumferential portion of the cylinder, before a state in which the front end side inner circumferential convex section comes in contact with the rod guide and the front end side outer circumferential seal section comes in contact with the inner circumferential portion of the cylinder, the base end side inner circumferential convex section comes in contact with the rod guide and the base end side outer circumferential seal section comes in contact with the inner circumferential portion of the cylinder.

4. The cylinder device according to claim 1, further comprising a front end side outer circumferential convex section formed at the front end side outer circumferential seal section and a base end side outer circumferential convex section formed at the base end side outer circumferential seal section, and come in contact with the inner circumferential portion of the cylinder to press the front end side inner circumferential abutting section and the base end side inner circumferential abutting section inward in the radial direction.

5. The cylinder device according to claim 1, wherein the seal ring is integrally formed with the closing section.

6. The cylinder device according to claim 1, wherein an outer diameter of the seal ring is larger than an inner diameter of the inner circumferential portion of the cylinder.

7. The cylinder device according to claim 1, wherein a contact surface of the rod guide with the seal ring is a tapered surface.

8. The cylinder device according to claim 1, wherein the front end side outer circumferential seal section and the front end side inner circumferential abutting section, and the base end side outer circumferential seal section and the base end side inner circumferential abutting section overlap each other at positions in an axial direction.

9. A seal member that is configured to come in contact with an annular inner circumferential portion and a rod guide formed in an inner circumferential portion to seal the inner circumferential portion, the seal member comprising:
- an annular closing section disposed coaxially with the rod guide; and
- an annular seal ring integrally formed with an outer circumferential side of the annular closing section to come in contact with the inner circumferential portion, wherein the seal ring includes:
  - a front end side outer circumferential seal section formed at the outer circumferential side to come in contact with the inner circumferential portion;
  - a base end side outer circumferential seal section formed at the outer circumferential side closer to the closing section than the front end side outer circumferential seal section to come in contact with the inner circumferential portion;
  - a front end side inner circumferential convex section protruding at an inner circumferential side to come in contact with an outer circumferential portion of the rod guide to press the front end side outer circumferential seal section outward in a radial direction; and
  - a base end side inner circumferential convex section protruding at the inner circumferential side closer to the closing section than the front end side inner circumferential convex section to come in contact with the outer circumferential portion of the rod guide to press the base end side outer circumferential seal section outward in the radial direction.

* * * * *